(12) United States Patent
Popovic et al.

(10) Patent No.: US 8,149,780 B2
(45) Date of Patent: Apr. 3, 2012

(54) MULTIPLEXING SCHEME IN A COMMUNICATION SYSTEM

(75) Inventors: Branislav M. Popovic, Solna (SE); Jaap van de Beek, Täby (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 599 days.

(21) Appl. No.: 11/653,114

(22) Filed: Jan. 11, 2007

(65) Prior Publication Data

US 2007/0177631 A1 Aug. 2, 2007

Related U.S. Application Data

(63) Continuation of application No. PCT/CN2004/000128, filed on Feb. 17, 2004.

(51) Int. Cl.
*H04J 11/00* (2006.01)
*H04J 4/00* (2006.01)
*H04J 1/00* (2006.01)
*H04K 1/10* (2006.01)
*H03D 5/00* (2006.01)

(52) U.S. Cl. ........ 370/330; 370/208; 370/478; 370/480; 375/260; 375/269

(58) Field of Classification Search .................. 370/203, 370/204, 206, 208–211, 312, 330, 343–345, 370/347, 478, 480–481, 498; 375/260, 269, 375/273–275, 279
See application file for complete search history.

(56) References Cited

U.S. PATENT DOCUMENTS

| | | | | |
|---|---|---|---|---|
| 6,175,550 B1 * | 1/2001 | van Nee | | 370/206 |
| 6,456,669 B1 * | 9/2002 | Sakoda | | 375/283 |
| 6,490,262 B1 | 12/2002 | Hogger | | 370/337 |
| 6,549,784 B1 | 4/2003 | Kostic et al. | | 455/501 |
| 6,587,498 B1 | 7/2003 | Sarkola | | 375/132 |
| 6,674,732 B1 * | 1/2004 | Boehnke et al. | | 370/320 |
| 6,985,531 B2 * | 1/2006 | McCarty, Jr. | | 375/244 |
| 2002/0018450 A1 * | 2/2002 | McKenna et al. | | 370/328 |
| 2002/0085641 A1 * | 7/2002 | Baum | | 375/260 |
| 2003/0072254 A1 * | 4/2003 | Ma et al. | | 370/208 |
| 2003/0095533 A1 * | 5/2003 | Joo et al. | | 370/343 |
| 2003/0099280 A1 * | 5/2003 | Kumar et al. | | 375/130 |

(Continued)

FOREIGN PATENT DOCUMENTS

CN 1286004 2/2001

(Continued)

OTHER PUBLICATIONS

Golomb, Solomon; The T4 and G4 Constructions for Costas Arrays. IEEE Transactions on Information Theory, 38(4):1404-1406, Jul. 1992.*

(Continued)

*Primary Examiner* — Aung S Moe
*Assistant Examiner* — Redentor Pasia
(74) *Attorney, Agent, or Firm* — Brinks Hofer Gilson & Lione

(57) ABSTRACT

A method and apparatus for multiplexing communication resources to multiple users in a communication system is provided. A generic time-frequency (T-F) mapping pattern (TFPgeneric) and a set of orthogonal T-F mapping patterns (TFPs) comprising TFPgeneric is generated. In each transmission time interval (TTI), the set of TFPs is cyclically offset by a random variable and the offset TFPs are allocated to one or more users and/or traffic channels.

17 Claims, 4 Drawing Sheets

U.S. PATENT DOCUMENTS

| | | | |
|---|---|---|---|
| 2004/0001429 A1* | 1/2004 | Ma et al. | 370/210 |
| 2004/0005016 A1* | 1/2004 | Tewfik et al. | 375/302 |
| 2004/0022183 A1* | 2/2004 | Li et al. | 370/210 |
| 2004/0062193 A1* | 4/2004 | Ma et al. | 370/208 |
| 2004/0161018 A1* | 8/2004 | Maric | 375/136 |
| 2005/0047325 A1* | 3/2005 | Singh et al. | 370/210 |

FOREIGN PATENT DOCUMENTS

| | | |
|---|---|---|
| WO | WO 03/001696 | 1/2003 |
| WO | WO 2004/073219 | 8/2004 |

OTHER PUBLICATIONS

Saberina et al. Multi-User UWB-OFDM Communications. Communications, Computers, and Signal Processing, 2003. PACRIM. 2003 IEEE Conference, Aug. 28-30, 2003, vol. 1, pp. 127-130.* van de Beek, J.J. et al., "3GPP Document R1-030018—3GPP TSG RAN WG1 #30", Jan. 7, 2003, pp. 1-8.*

S. W. Golomb and H. Taylor, "Construction and properties of Costas arrays," Proc. IEEE, vol. 72, pp. 1143-1163, Sep. 1984.

S.W. Golomb and L.R. Welch, "Perfect codes in the Lee metric and the packing of polynominoes", SIAM J. Appl. Math., vol. 18, No. 2, pp. 122-137, Jan. 1970.

"3rd Generation Partnership Project: Technical Specification Group Radio Access Network; Feasibility Study for OFDM for UTRAN enhancement; (Release 6)" 3GPP Draft; R1-031436 TR25892 V0.5.2, 3rd Generation Patrnership project (3GPP), Mobile Competance Center; 650, Dec. 2003.

Huawei "Revised text proposal for OFDM User Traffic Multiplexing Solutions" 3GPP Draft; R1-030970, 3rd Generation Partnership Project (3GPP), Mobile Competence Centre; 650, Oct. 2, 2003.

Huawei "Updated text proposal for OFDM User Traffic Multiplexing Solutions", 3GPP TSG RAN WGI #35, R1-031172, Nov. 17-21, 2003.

Huawei, "Time-frequency mappings of OFDM units for full frequency reuse without resource planning", 3GPP TSG RAN WG1 #33, R1-030799, Aug. 25-29, 2003.

Golomb W. et al, "The T4 and G4 Constructions for Costas Arrays", IEEE transactions on Information Theory, vol. 38, No. 4, Jul. 1992.

Albdaiwi and Bose et al, "Quasi-Perfect Lee Distance Codes", IEEE Transactions on Information Theory, vol. 49, No. 6, pp. 1535-1539, Jun. 2003.

Nortel Networks, "OFDM Unit Multiplexing", 3GPP TSG-RAN-1 Meeting #32, R1-030522, May 19-23, 2003.

Huawei, "Diversity gains of some time-frequency mapping alternatives for OFDM", 3GPP TSG RAN WG1 #30, R1-030018, Jan. 1-7, 2003.

Nortel Networks, "Benefits of Frequency Hopping for the OFDM DL", 3GPP TSG-RAN-1 Meeting #32, R1-030523, May 19-23, 2003.

Moreno Oscar and Maric et al, "A new Family of Frequency-Hop Codes", IEEE Transactions on Communications, vol. 48, No. 8, pp. 1241-1244, Aug. 2000.

Communication from European Patent Office issued in corresponding European Patent Application No. 04711554.8, mailed Apr. 7, 2010.

Huawei "Text Proposal for Section 6.2.4 in TR25.892 on OFDM User Multiplexing" 3GPP TSG RAN WG1 #32 R1-30800, Aug. 25-29, 2003.

* cited by examiner

MULTIPLEXING SCHEME IN A COMMUNICATION SYSTEM

CROSS-REFERENCES TO RELATED APPLICATION

This is a continuation of International Application No. PCT/CN2004/000128 filed Feb. 17, 2004, the entire disclosure of which is hereby incorporated herein by reference.

BACKGROUND OF THE INVENTION

1. Field of the Invention

The invention is related to the field of radio communications, and in particular to radio communication systems employing time and frequency-divided multiple access schemes.

2. Related Technology

In any communication system including several users sharing the transmission medium, i.e. the available communication resources, special attention must be given to the co-existence of the different signals being present within the communication system. The users of the communication system generally share the same pool of communication resources. When allocating the communication resources (for example different channels) to the multiple users, it is realized that the signal of one user may affect (interfere with) the signal of another user. A communications system designer thus has to design a user traffic multiplexing scheme bearing this in mind, and thus design the multiplexing scheme so as to handle this undesired interference.

In communication systems in which a geographical division is used, i.e. a cellular system, there are mainly two kinds of multi-user interference present. Firstly, the interference from users within the same geographical area, called a cell, the so called intra-cell interference, and secondly the interference from users in adjacent (neighboring) cells, the so called inter-cell interference. The inter-cell interference may be decreased for example by means of resource planning (e.g. frequency planning), so that a specific communication resource is reused in such a way that interference is minimized. For frequency planning the inter-cell interference may be minimized by using a frequency reuse scheme, in which a certain frequency is not used in neighboring cells. However, resource planning, for example frequency planning and coordination between cells, is most time consuming, rather expensive and in some cases not even feasible.

Besides resource planning, whereby inter-cell interference may be decreased, there are other ways to decrease interference. One way to decrease both intra-cell interference and inter-cell interference is to utilize frequency hopping. Frequency hopping consists in changing the frequency used by a channel at regular intervals. Thus, cells using the same frequencies but different, presumably de-correlated, hopping sequences lead to decreased interference.

WO03/001696 describes a method for decreasing inter-cell interference. Frequencies are allocated to cells in a communication system according to functions selected to minimize repeated collisions between hopping sequences used by the base stations of neighboring cells. This is thus an example of a prior art method for decreasing inter-cell interference in a communication system, and in which system also resource planning is performed.

The international patent application PCT/CN03/00133 describes a method for interleaving in an OFDM system. The method described exploits the two-dimensional time-frequency structure of an OFDM system, and maps OFDM units onto frequency sub-bands in a way that maximizes the diversity performance.

In the prior art discussed above, the different aspects of allocating communication resources are treated more or less one at a time. It would however be desirable to provide a method for allocating communication resources to several users, in which all the aspects are considered simultaneously. A desired method should thus take into account the interference within a cell as well as the interference between cells in such a way that the total interference is minimized, whilst maximizing the diversity performance for each user. Further, it would be desirable to provide such method where expensive; time consuming and tedious resource planning is avoided.

SUMMARY OF THE INVENTION

The invention provides a method for allocating communication resources to multiple users in a time and frequency divided communication system, so as to completely avoid intra-cell interference, at the same time as the inter-cell interference is minimized, and where the communication system does not utilize any resource planning (e.g. frequency planning).

In accordance with the invention, a method for allocating communication resources to multiple users is provided, utilizing the properties of a mathematical function for maximizing the performance of a time-frequency divided communication system. The method comprises the steps of: generating a generic time-frequency (T-F) mapping pattern (TFPgeneric), generating a set of orthogonal T-F mapping patterns from said generic T-F mapping pattern (TFPgeneric), performing a random variable cyclic offsetting of said set of orthogonal T-F mapping patterns in each transmission time interval (TTI), and allocating the orthogonal T-F mapping patterns to the one or more users and/or traffic channels in each transmission time interval (TTI). Thereby the inter-cell interference is averaged, any intra-cell interference is avoided and the method requires no network resource planning.

In accordance with one embodiment of the invention the generic time-frequency pattern is a generic Costas sequence. Such Costas sequence based time-frequency patterns have desirable properties with respect to interference and diversity, providing high diversity gain while at the same time minimizing inter-cell and avoiding intra-cell interference. Further, all T-F patterns in the set are obtained from a first pattern giving an easily implemented and easily administrated way to obtain orthogonal T-F mapping patterns.

In accordance with one embodiment of the invention, the Costas sequence is obtained by a T4 construction. This choice of Costas sequence provides improved diversity gain compared to the other choices of Costas sequences. In accordance with one embodiment of the invention said random cyclic offset is changed for each transmission time interval (TTI), according to a cell-specific multi-level pseudo-random sequence. Consequently, the different cells within the communication system will use in principle different cyclically shifted versions of the same set of time-frequency mapping patterns. The unique cross-correlation properties of the set of time-frequency mapping patterns ensure limited cross-interference between any two cells at any time. This random offsetting in each TTI also makes instantaneous interference to appear noise-like.

In accordance with another embodiment of the invention, the set of orthogonal T-F mapping patterns is generated by cyclic shifts in the frequency domain of said generic time-frequency (T-F) mapping pattern (TFPgeneric). Thereby a set of orthogonal T-F mapping patterns is obtained in an easy and convenient fashion, and further ensures that the set of patterns is orthogonal. The random variable cyclic offsetting could then be performed in the time domain, giving maximum cross-correlations not significantly higher than the ideal values guaranteed for Costas sequences by definition.

In an alternative embodiment, the set of orthogonal T-F mapping patterns is generated by cyclic shifts in the time domain, and said random variable cyclic offsetting could then be performed in the frequency domain. Thereby a very flexible solution for multiplexing is provided, giving a network designer alternative ways to implement the invention.

In accordance with another embodiment of the invention, the orthogonal T-F mapping patterns are randomly allocated to the multiple users and/or traffic channels in each TTI. This feature decreases the probability of collisions between signals from the different cells.

In accordance with another embodiment of the invention, a transmitter for performing said method is provided, and such a system, both yielding corresponding advantages.

DETAILED DESCRIPTION OF PREFERRED EMBODIMENTS

In order to receive a full understanding of the invention, a brief description of an OFDM (Orthogonal Frequency Division Multiplexing) system is provided. However, an OFDM system is only an example of a time and frequency-divided system in which the invention may be implemented, and it is understood that the invention may be implemented in other time and frequency-divided systems as well.

OFDM is a transmission technique that allows high data rates to be transmitted over very noisy channels, yet at a comparatively low complexity, and is used for digital audio broadcasting (DAB) and digital video broadcasting (DAB). OFDM has several favorable properties like high spectral efficiency and robustness to channel dispersion, for which reasons it will most likely be used for future broadband applications such as digital mobile radio communication.

In an OFDM system the data to be transmitted are spread over a large number of carriers, and the data rate to be transferred by each of these carriers is consequently reduced in proportion to the number of carriers. The carriers have an equal, precisely chosen frequency spacing, and the frequency bands of the sub-carriers are not separate but overlap. By using an IFFT (Inverse Fast Fourier Transform) as modulation, the spacing of the sub-carriers is chosen in such a way that at the frequency, where a received signal is evaluated, all other signals are zero. The choice of carrier spacing is made so that orthogonality is preserved, giving the method its name.

OFDM systems transmit constellation symbols block-wise. A block of constellation symbols is transmitted during one OFDM symbol interval. During a subsequent OFDM symbol interval, a new block of constellation symbols is transmitted and so on. Thus, any transmitted constellation symbol in an OFDM system can be characterized by two indexes: the first index indicating during which OFDM symbol interval it is transmitted, and the second index indicating which of the sub-channels it is transmitted on.

Figure 1:
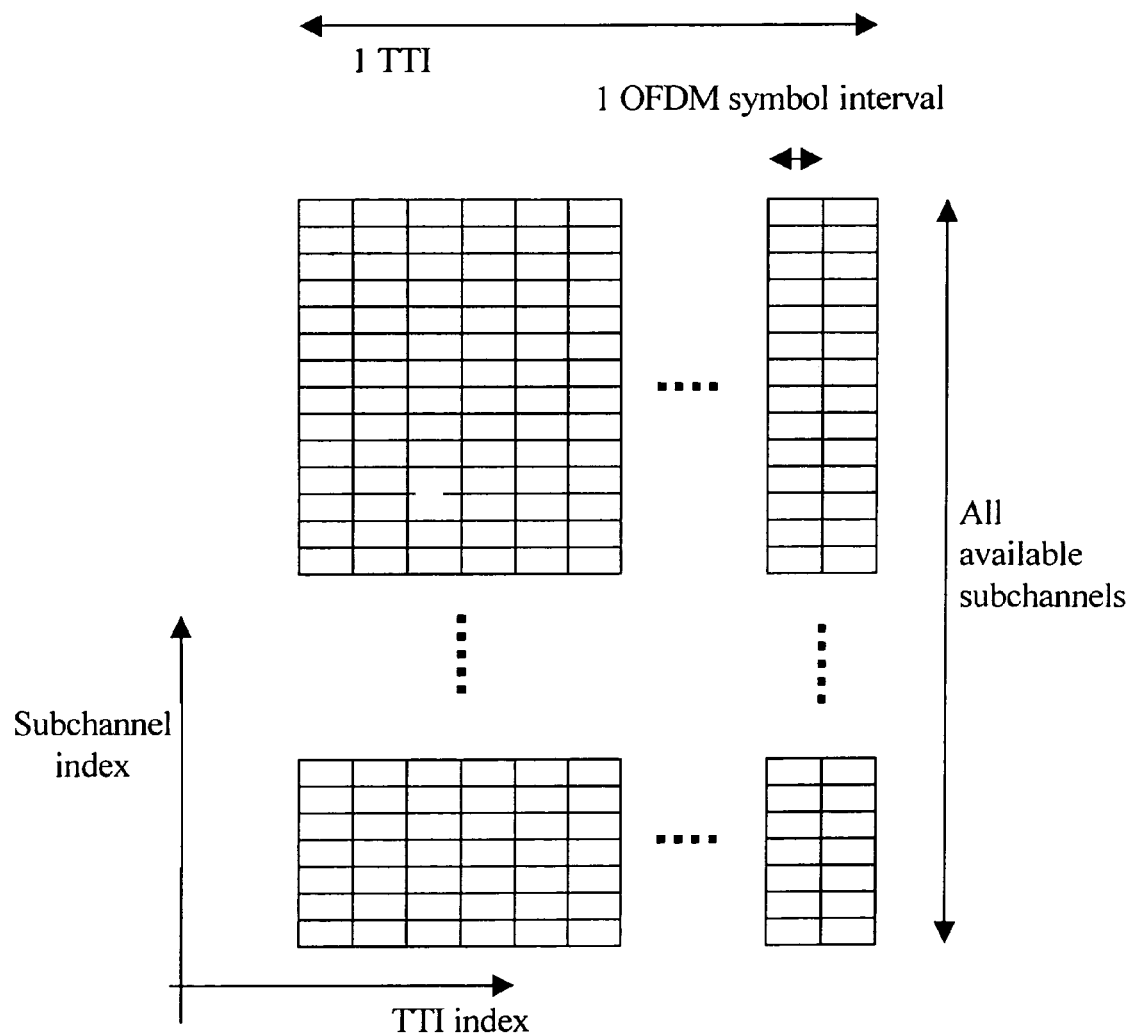
FIG. 1 shows schematically the structure of the communication resources in a time-frequency divided communication system.

With reference to FIG. 1, a time-frequency resource grid is shown, where TTI (Transmission Time Interval) indices are shown on the x-axis, and sub-channel indices on the y-axis. In the illustrative communication system used to explain the invention, data is transmitted in packets and each packet is transmitted during a transmission time interval, TTI. A TTI consists of a fixed finite number of OFDM symbol intervals. Each cell in the figure can carry a constellation symbol and is characterized by the two indexes mentioned above: the first index indicating during which particular OFDM symbol interval in a particular TTI it is transmitted and the second index indicating which particular sub-carrier frequency (sub-channel index) is used for its transmission.

User traffic multiplexing is the allocation of transmitter resources (such as time, frequency, antennas, etc.) to the different traffic channels within the same cell, so that the resulting physical channels can co-exist preferably without mutual interference, or with as little interference as possible. Particularly, in this application, it is assumed that the communication resources to be allocated are time and frequency divided resources, divided into time slots (TS) and frequency sub-bands, respectively, where each sub-band contains a number of subcarriers. Then the user traffic multiplexing can be defined as the allocation of a particular sequence of sub-bands for the transmission of each traffic channel during a TTI.

A time-frequency (T-F) mapping pattern is a sequence of indices of the sub-bands used for the transmission within a TTI. The time-frequency mapping patterns thus specify the different physical channels, one T-F mapping pattern for each physical channel.

An OFDM unit is a group of constellation symbols transmitted in a sub-band during a time slot (OFDM symbol interval). Thus a T-F mapping pattern is used to map a number of OFDM units onto the time-frequency grid within a TTI. In practice, certain sub-carriers will be reserved for pilots and signaling, which may lead to variation in OFDM unit size and to mapping of certain OFDM units onto non-contiguous sub-carriers.

In accordance with the invention, all the cells of a cellular communication system employ the same, special set of T-F mapping patterns for multiplexing the traffic. Thus no network resource planning is needed, and consequently no network capacity needs to be reserved for such planning. Thus, given the fact that other neighboring cells employ the same resource grid (users in neighboring cells thus run the risk of transmitting data on the same sub-carriers and during the same OFDM symbol intervals), the problem is now to assign the communication resources in each cell to the users in such a way that 1. The interference within cells is minimized (intra-cell interference),
2. The interference form other cells is minimized (inter-cell interference), and
3. The diversity-performance for each user is maximized.

For a given user, the inter-cell interference appears in the form of "hits" or "collisions" (i.e. occurrences of data in other cells transmitted at the same frequencies and during the same OFDM symbol interval), either from the identical T-F mapping pattern used in another cell or from other T-F mapping patterns used in another cell.

In order to obtain a maximized diversity gain, the T-F mapping pattern should be such that every pair of OFDM units is separated in time and frequency as much as possible. This qualitative description can be mathematically formulated as the requirement to maximize the minimum Lee distance between the elements of a T-F mapping pattern. The Lee distance between the two points is the sum of the absolute values of the differences of the corresponding coordinates.

In accordance with the invention, the generic T-F mapping pattern TFPgeneric, might be obtained from a Costas sequence. Briefly, a Costas sequence is a mathematical sequence having certain particularly beneficial correlation characteristics. By definition, the number of hits between a Costas sequence and its arbitrary (non-cyclic) time and frequency-shifted version is equal to 0 or 1. For further information on Costas sequences, see for example S. W. Golomb and H. Taylor, "Construction and properties of Costas arrays", Proc. IEEE, vol. 72, pp 1143-1163, September 1984.

The invention utilizes the beneficial properties of Costas sequences for application to a multiplexing scheme in an OFDM system. When basing the T-F mapping patterns used in a communication system on the Costas sequence, all the above mentioned aspects of resource allocation are optimized concurrently. That is, the inter-cell interference is minimized, the intra-cell interference is completely avoided, the diversity performance for each user is maximized and no network planning is needed. There are mathematical functions that would render an even better diversity performance, but then the interference performance would suffer.

In accordance with the invention, the orthogonal set of T-F mapping patterns is obtained from a generic Costas sequence. This may be accomplished either by using the original-size Costas sequence or by adjusting it to the size of the T-F grid, as will be explained more in detail below by means of some specific examples. The adjustment may include or consist of a periodic extension of the generic Costas sequence or of shortening the generic Costas sequence.

In accordance with the invention, an orthogonal set of T-F mapping patterns is obtained by cyclic shifts in the frequency domain of the generic T-F mapping pattern, and thereby there will be no interference within a cell. In an alternative embodiment the orthogonal set of T-F mapping patterns is obtained by cyclic shifts in the time domain of the generic T-F mapping pattern. This design ensures that the set of T-F mapping patterns is orthogonal, i.e. no hits (or rather, collisions) will occur between the different patterns (different physical channels). Further, all the available time-frequency resources are utilized, meaning that all time slots (OFDM symbol intervals) and all sub-bands are used if all patterns are deployed.

High diversity gain of each T-F mapping pattern is achieved, since the generic Costas sequence possesses good Lee distance properties. The diversity gain of all T-F patterns can be further maximized by choosing a specially constructed Costas sequence, having an improved minimum Lee distance.

Figure 2:
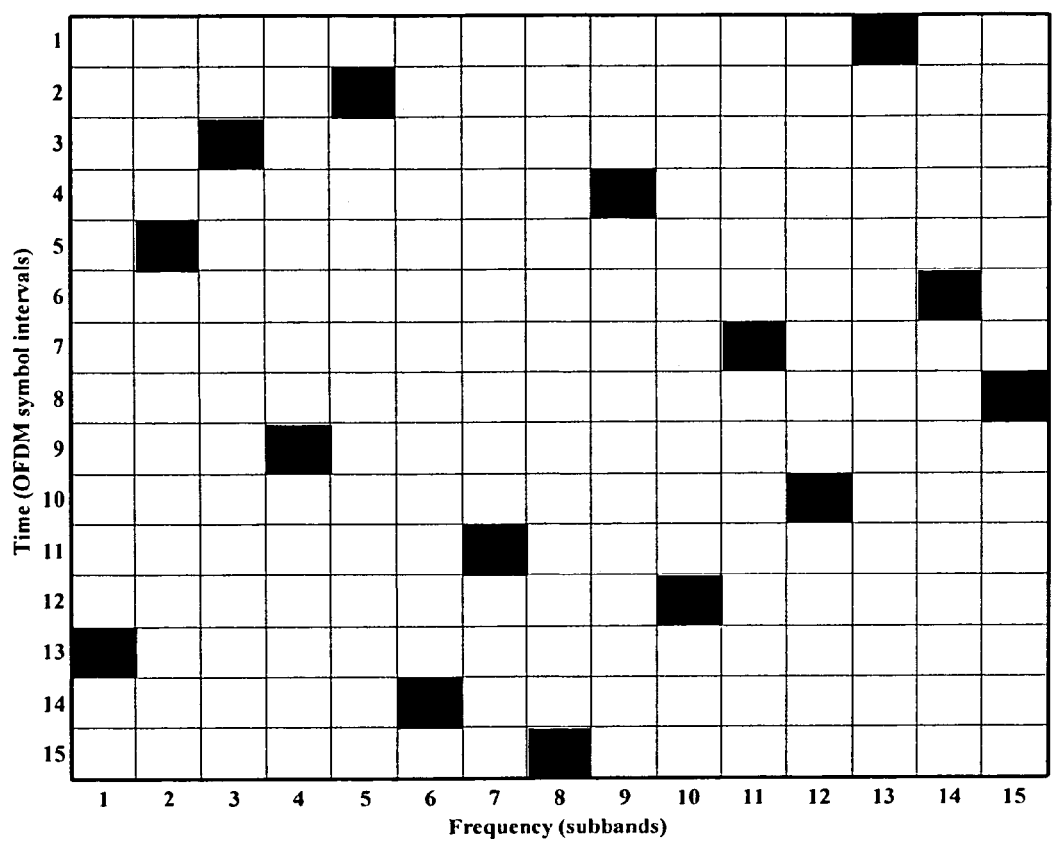
FIG. 2 shows an exemplary time-frequency mapping pattern.

With reference now to FIG. 2, starting with the shown exemplary T-F mapping, 14 cyclic shifts in the frequency domain may be performed, giving a total of 15 T-F mapping patterns. This set of T-F mapping patterns is an orthogonal set and is allocated to a single cell. All these T-F mapping patterns are then cyclically time-shifted by a cell specific offset, corresponding to an integer number of OFDM symbols. That is, a time slot index (for example an integer in the interval 1-15) may be randomly assigned to a cell. This cell specific time offset is changed for each TTI in accordance with a cell-specific multi-level pseudo-random sequence. In that way the different cells, even though being synchronous in one specific TTI (thus causing interference), they will most likely be asynchronous in the next TTI. The cross-interference is thus minimized, as predicted by the correlation properties of the T-F mapping patterns. Stated another way, the inter-cell interference is truly randomized in time, from one transmission time interval to another, by the random cyclic time-shifts of the whole set of orthogonal codes.

In an alternative embodiment, the 14 cyclic shifts are not performed in the frequency domain, but in the time domain, again giving a total of 15 T-F mapping patterns. This set of T-F mapping patterns is also an orthogonal set and is allocated to a single cell. All these T-F mapping patterns are then cyclically frequency-shifted (instead of time-shifted) by a cell specific offset, corresponding to an integer number of OFDM symbols. That is, a frequency sub-band index (for example an integer in the interval 1-15) may be randomly assigned to a cell. This cell specific offsetting is again changed for each TTI in accordance with a cell-specific multi-level pseudo-random sequence. As in the embodiment above, the different cells, even though being synchronous in one specific TTI (thus causing interference), they will most likely be asynchronous in the next TTI, and the cross-interference is thus minimized.

The different sequences of offsets, both in time or in frequency, can for example be generated as time-shifted versions of a single multi-level pseudo-random sequence.

In accordance with the invention, one or more T-F mapping patterns may be allocated to a single user, for example in dependence on the amount of traffic data for the transmission, or in dependence on available communication resources or on the priority of a specific user. However, within each cell, no T-F mapping pattern is assigned to more than one user during the same TTI, and thereby any potential intra-cell interference is eliminated.

In accordance with the invention, random allocation of the orthogonal T-F mapping patterns to the multiple users and/or traffic channels in each TTI decreases the probability of collisions between the signals from the different cells. It is however contemplated that the allocation may be performed in a pseudo-random or even non-random way, i.e in a fixed way.

In spite of the design of the generic T-F mapping pattern as a Costas sequence and in spite of the fact that the sets of T-F mapping patterns in neighboring cells are subject to a random cyclic time-shift, occasionally the exact same T-F mapping pattern may appear in two neighboring cells at the same time. In many cases, these instants where all OFDM units in a physical channel collide at the same time, dominate the performance of the relevant traffic channel. Depending on the allocation strategy this situation may occur more of less often. In particular, when random allocation of the orthogonal T-F mapping patterns to the multiple users and/or traffic channels in each TTI is performed, the properties of the Costas sequences are best exploited and the probability that all OFDM units collide is reduces significantly, compared to other fixed allocation strategies.

As the set of T-F patterns in some TTI is obtained by cyclically shifting the generic T-F mapping pattern in the frequency and time domain, the definition property mentioned earlier (i.e. number of hits between a Costas sequence and its arbitrary (non-cyclically) time and frequency-shifted version equals 0 or 1) is not applicable exactly and the number of hits may be higher. However, it is reasonable to expect, and can in fact be proven by examples, that the actual maximum cross-correlations are not significantly higher than the ideal values.

The invention is described below by means of specific examples of the allocation in accordance with the inventive method.

EXAMPLES

Again with reference to FIG. 2, the set of 15 orthogonal T-F mapping patterns, one for each OFDM physical channel, is derived from a single Costas sequence of length 15 obtained from the so-called T4 construction. This generic T-F pattern, TFPgeneric, is shown in FIG. 2, as a sequence of indices of the frequency sub-bands used for the transmission within one TTI.

Case (A): For a T-F grid with 12 OFDM symbol intervals (time slots) and 15 frequency sub-bands, the first pattern is obtained by discarding the last three symbols of the generic Costas sequence, in order to obtain the patterns of length NOFDM=12.

Case (B): For a T-F grid with 27 OFDM symbol intervals (time slots) and 15 frequency sub-bands, the first pattern is obtained by extending the generic Costas sequence by the reversed first 12 symbols of the same generic pattern, in order to obtain the patterns of length NOFDM=27.

Mathematically these two cases may be expressed as $TFP0(A)=TFP$generic$(1:12)$ $TFP0(B)=[TFP$generic $TFP$generic$(12:-1:1)]$ where (a:b) denotes the sequence of integers (a, a+1, a+2, . . . , b−1, b), (b:−1:a) denotes the sequence of integers (b, b−1, b−2, . . . , a+1, a), and [A B] denotes the straightforward concatenation of 2 sequences.

For the first case, case (A), the first two T-F mapping patterns are given by:

$TFP0(A)=[13\ 5\ 3\ 9\ 2\ 14\ 11\ 15\ 4\ 12\ 7\ 10]$ $TFP1(A)=[14\ 6\ 4\ 10\ 3\ 15\ 12\ 1\ 5\ 13\ 8\ 11]$

For the second case, case (B), the first two T-F mapping patterns are given by:

$TFP0(B)=[13\ 5\ 3\ 9\ 2\ 14\ 11\ 15\ 4\ 12\ 7\ 10\ 1\ 6\ 8\ 10\ 7\ 12\ 4\ 15\ 11\ 14\ 2\ 9\ 3\ 5\ 13]$ $TFP1(B)=[14\ 6\ 4\ 10\ 3\ 15\ 12\ 1\ 5\ 13\ 8\ 11\ 2\ 7\ 9\ 11\ 8\ 13\ 5\ 16\ 12\ 15\ 3\ 10\ 4\ 6\ 14]$

Figure 3:
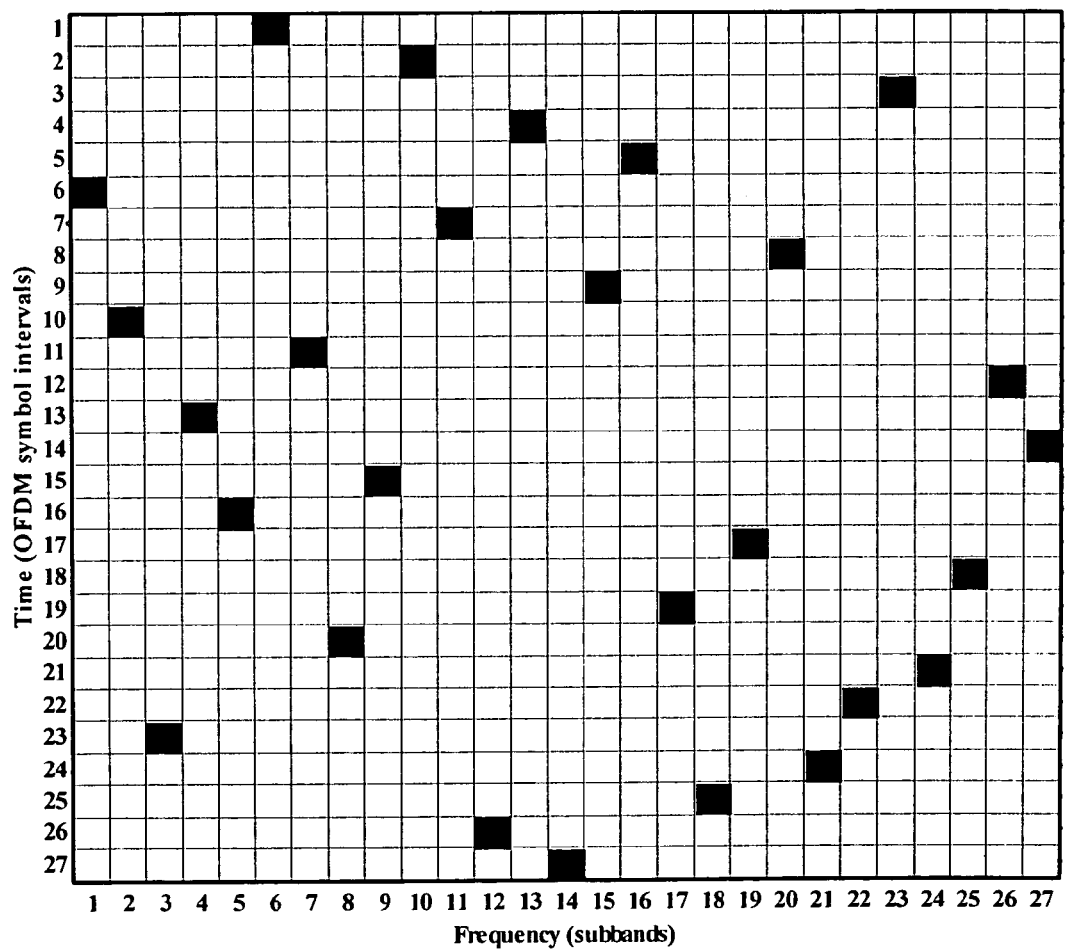
FIG. 3 shows another exemplary time-frequency mapping pattern.

With reference to FIG. 3, another generic Costas sequence, with minimum Lee distance equal to 3, is shown. In particular, the Costas sequence shown is a T4 Costas sequence of length 27. The T4 construction ensures T-F mapping patterns with a minimum Lee distance equal to 3. The Lee distance gives an indication of the proximity of elements of a T-F pattern, as was explained above, and this choice of Costas sequence separates every pair of OFDM units as much as possible in time and frequency, and thus gives a very high diversity gain.

Figure 4:
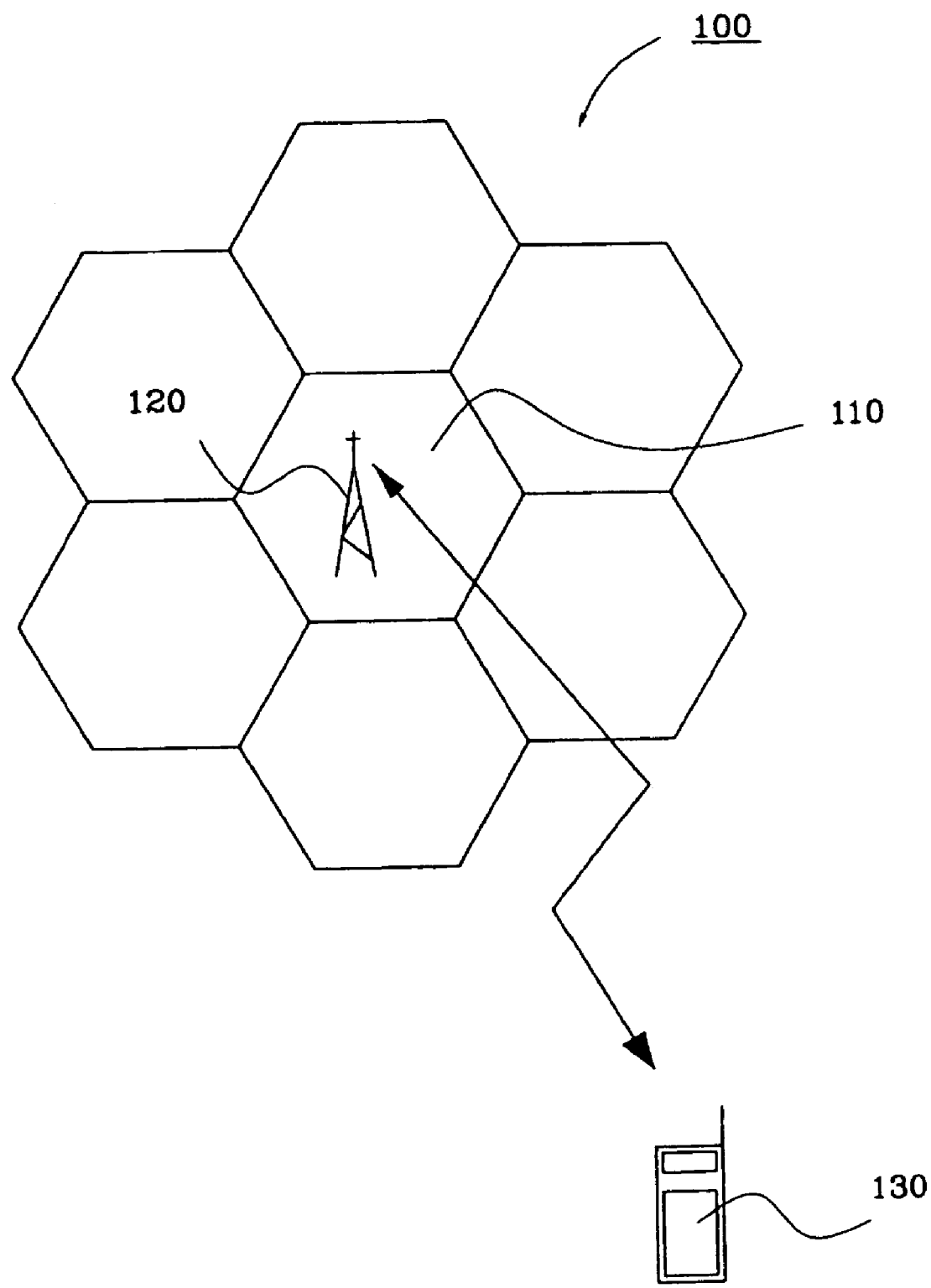
FIG. 4 shows an exemplary transmitter implementing the invention, and a system in which it may be used.

Now with reference to FIG. 4, the invention also encompasses a communication system, generally denoted 100, implementing the inventive method for multiplexing. The communication system 100 is preferably divided into several cells 110, each cell including a base station 120 servicing multiple users having some kind of an user equipment 130. The base station 120 and user equipment 130, respectively, includes transmitter(s) including means for implementing the method in accordance with the invention. A person skilled in the art realizes that the multiplexing may be performed elsewhere in the system, such as for example in a mobile switching centre (MSC), a base station controller (BSC), or the like, depending on the communication system in question. The base station and user equipment 130, respectively, may for example include a transceiver and processor (not shown) appropriately programmed for wireless communication in accordance with the invented method for multiplexing. It is further understood that the demultiplexing is performed correspondingly.

In summary, the invention provides a method yielding all of the following advantages:

1. Intra-cell interference is completely avoided.
2. Inter-cell interference is reduced.
3. Most of the available diversity in the TTI is captured.
4. The above advantages 1-3 are accomplished without network resource planning.

The invention has been described in conjunction with preferred embodiments. It is evident that numerous alternatives, modifications, variations and uses will be obvious to a person skilled in the art in light of the foregoing description. For example, the communication system need not be an OFDM system, so the invention could also be used in other frequency-hopping systems, such as for example GSM.

What is claimed is:

1. Method for multiplexing one or more users and/or traffic channels to one or more communication resources in a time-frequency divided communication system, wherein the multiplexing does not require communication resource planning, and is represented by a set of time-frequency (T-F) mapping patterns (TFPs), the method comprising:
    generating, by the time-frequency divided communication system, a generic TFP ($TFP_{generic}$);
    generating, by the time-frequency divided communication system, a set of orthogonal TFPs from said $TFP_{generic}$;
    performing, by the time-frequency divided communication system, a pseudo-random variable cyclic offsetting of said set of orthogonal TFPs in each transmission time interval (TTI);
    changing said pseudo-random cyclic offset for each TTI, according to a cell-specific multi-level pseudo-random sequence; and
    allocating, by the time-frequency divided communication system, the pseudo-randomly cyclically offset orthogonal TFPs to the one or more users and/or traffic channels in each TTI for multiplexing the one or more users and/or traffic channels to the one or more communication resources in the time-frequency divided communication system.

2. Method of claim 1, wherein said $TFP_{generic}$ is a Costas sequence.

3. Method of claim 2, comprising obtained said Costas sequence by a $T_4$ construction.

4. Method of claim 1, comprising generating said set of orthogonal T-F mapping patterns by cyclic shifts in the frequency domain of said $TFP_{generic}$.

5. Method of claim 4, comprising performed said pseudo-random variable cyclic offsetting in the time domain.

6. Method of claim 1, comprising generating said set of orthogonal T-F mapping patterns by cyclic shifts in the time domain of said $TFP_{generic}$.

7. Method of claim 6, comprising performing said pseudo-random variable cyclic offsetting in the frequency domain.

8. Method of claim 1, comprising performing said allocation of the pseudo-randomly cyclically offset orthogonal TFPs by pseudo-random selection of a T-F mapping pattern that is used by a given user and/or traffic channel in each TTI.

9. A transmitter for use within the time-frequency divided communication system, including a device to execute the multiplexing method as claimed in claim 1.

10. The time-frequency divided communication system for communication of signals, the time-frequency divided communication system including at least one transmitter of claim 9.

11. The system of claim 10, comprising a receiver adapted to a cell-specific multi-level pseudo-random sequence.

12. The method of claim 1, wherein the time-frequency divided communication system is a wireless cellular communication system dividing an area of wireless coverage into a plurality of cells and wherein wireless communication resources are allocated according to the cyclically offset TFPs within a cell of the wireless cellular communications system irrespective of, and in absence of, communication resources planning of the various cells.

13. The method of claim 1, wherein the time-frequency divided communication system is a wireless cellular communication system comprising a plurality of cells and wherein the plurality of cells all apply one and the same set of TFPs for multiplexing of the respective one or more users and/or traffic channels of a cell of the wireless cellular communication system.

14. The method of claim 13, wherein within each cell, no TFP is assigned to more than one user during the same ITT.

15. Method of claim 1, wherein said $TFP_{generic}$ is a periodic extension of a Costas sequence.

16. Method of claim 1, wherein said $TFP_{generic}$ is a shortened Costas sequence.

17. Method of claim 1, wherein different cells within the communication system use different cyclically shifted versions of the same set of TFPs.

* * * * *